United States Patent [19]
Jabsen

[11] 3,987,860
[45] Oct. 26, 1976

[54] NUCLEAR REACTOR CORE STABILIZING ARRANGEMENT

[75] Inventor: Felix S. Jabsen, Lynchburg, Va.

[73] Assignee: The Babcock & Wilcox Company, New York, N.Y.

[22] Filed: Sept. 19, 1973

[21] Appl. No.: 400,485

Related U.S. Application Data

[63] Continuation of Ser. No. 823,305, May 9, 1969, abandoned.

[52] U.S. Cl. ............................................... 176/87
[51] Int. Cl.² .......................................... G21C 19/12
[58] Field of Search .................. 176/40, 85, 87, 27, 176/28, 29

[56] References Cited
UNITED STATES PATENTS

| | | |
|---|---|---|
| 2,998,370 | 8/1961 | Gaunt et al. ............................ 176/85 |
| 3,011,962 | 12/1961 | Koch et al. ............................ 176/28 |
| 3,124,514 | 2/1964 | Koutz et al. ........................... 176/40 |
| 3,180,799 | 4/1965 | Blake ..................................... 176/40 |
| 3,215,608 | 11/1965 | Guenther .............................. 176/87 |
| 3,549,491 | 12/1970 | Johnson ................................ 176/87 |
| 3,627,634 | 12/1971 | Guenther et al. ..................... 176/87 |

*Primary Examiner*—Samuel W. Engle
*Assistant Examiner*—S. A. Cangialosi
*Attorney, Agent, or Firm*—J. M. Maguire; J. P. Sinnott

[57] ABSTRACT

A nuclear reactor core stabilizing arrangement wherein a plurality of actuators, disposed in a pattern laterally surrounding a group of elongated fuel assemblies, press against respective contiguous fuel assemblies on the periphery of the group to reduce the clearance between adjacent fuel assemblies thereby forming a more compacted, vibration resistant core structure.

7 Claims, 4 Drawing Figures

NUCLEAR REACTOR CORE STABILIZING ARRANGEMENT

This is a continuation of application Ser. No. 823,305, filed May 9, 1969, now abandoned.

BACKGROUND AND SUMMARY OF THE INVENTION

This invention relates in general to nuclear reactor core construction and more particularly to a nuclear reactor core stabilizing arrangement whereby fuel elements making up the core are pressed together and thereby stabilized against vibration induced by coolant flow through the core or by externally applied forces, such as seismic or other vibration induced forces.

In reactor cores having a plurality of elongated fuel assemblies positioned together in adjacent, laterally spaced-apart relation to one another to form a compact group, there generally exist clearance gaps of somewhat differing dimensions between adjacent fuel assemblies. This presents a problem under seismic and dynamic loading conditions, since the assemblies, with their high long column slenderness ratio can be easily set vibrating and such vibration can cause them to slam together with high impact loads, and the consequent hazard of breakage. To withstand such impact, canned fuel assemblies were used in the prior art.

The invention provides a core stabilizing arrangement whereby the fuel assemblies within the core are passed together at the mid-point of their span by actuators arranged in a pattern laterally surrounding the core. These actuators have platens positioned for contact with respective assemblies positioned about the periphery of the core. Consequently, the clearance between adjacent assemblies is reduced and the core assembly is firmly compacted to resist vibration, and to minimize the amplitude of any vibration that does occur. With the invention, it is therefore permissible to use less expensive canless fuel assemblies without sacrificing core integrity.

According to a preferred embodiment of the invention, the actuators are operated by input forces induced and applied by the emplacement of an upper grid structure that serves, together with a lower grid structure, to hold and retain the fuel assemblies in their intended parallel alignment. These input forces are directed substantially parallel to the longitudinal axis of the fuel assemblies, whereas the output forces exerted by the actuator platens against the fuel assemblies are directed in a substantially common plane perpendicular to these same axes.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DESCRIPTION OF THE PREFERRED EMBODIMENTS OF THE INVENTION

Figure 1:
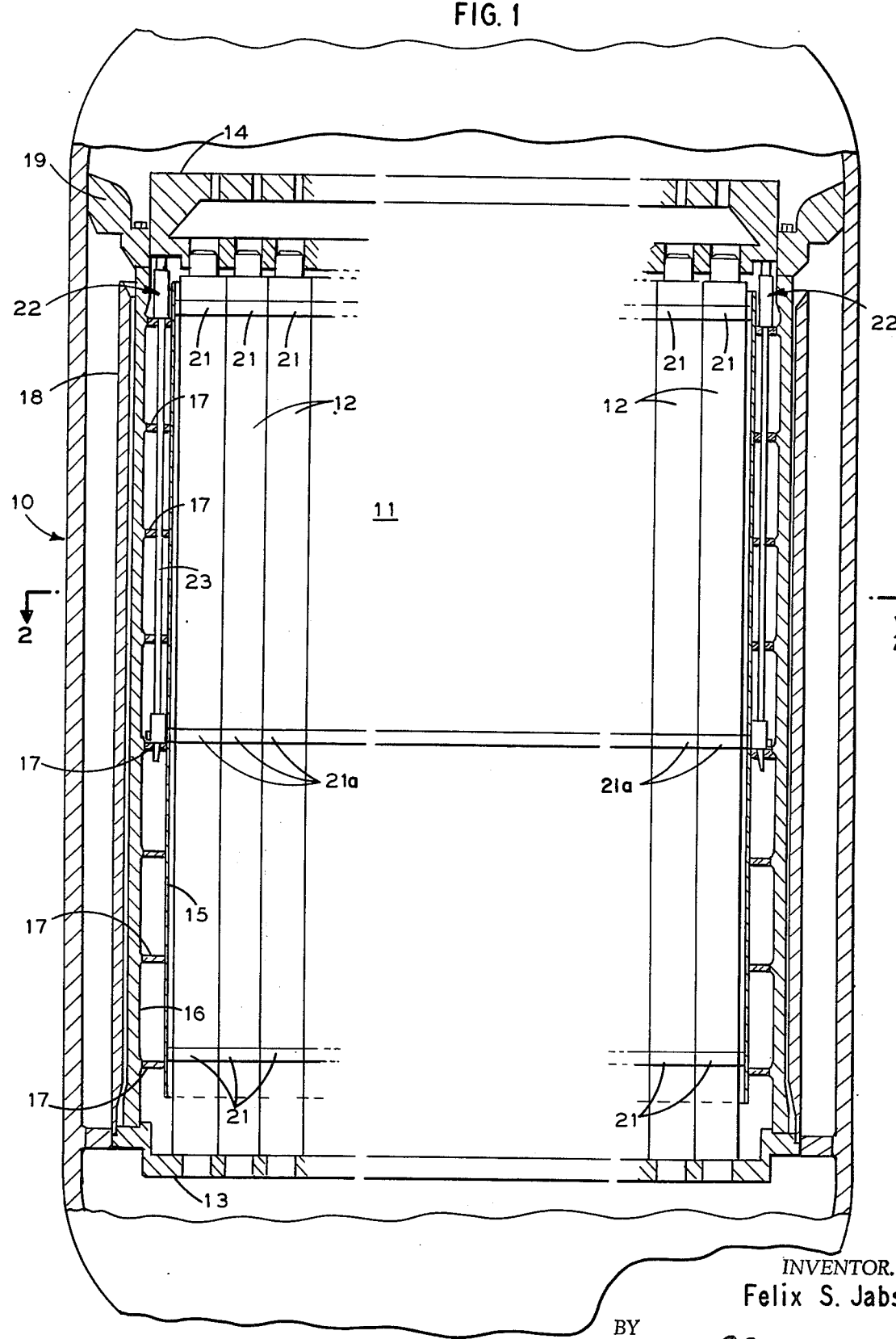
FIG. 1 is a schematic elevation view, partly in section, of a nuclear reactor core structure provided with a core stabilizing arrangement according to a preferred embodiment of the invention.
Figure 2:
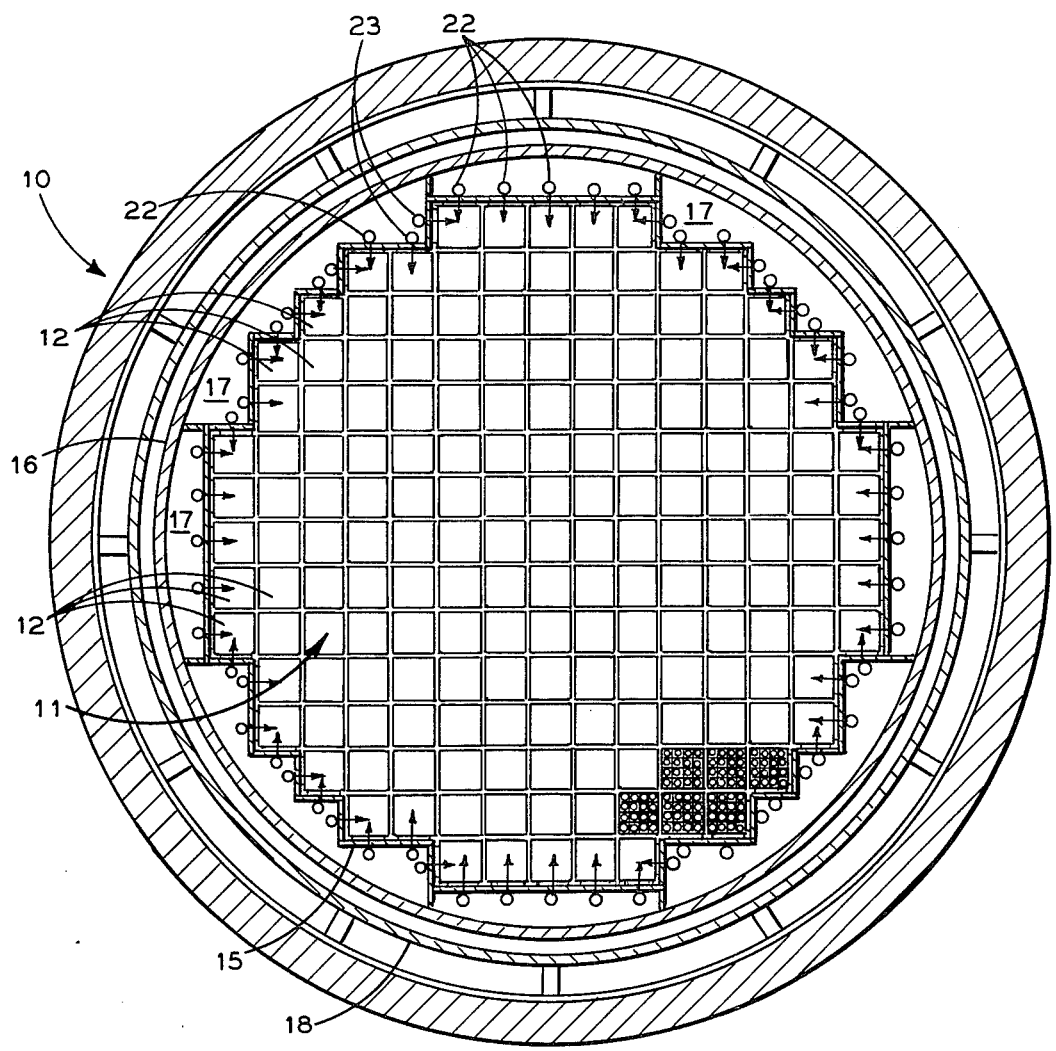
FIG. 2 is a schematic plan view of the reactor core and stabilizing arrangement shown in FIG. 1, as taken along the section indicated by line 2-2.

The nuclear reactor 10 shown in FIGS. 1 and 2 has a core 11 composed of a plurality of elongated fuel assemblies 12 positioned in adjacent, laterally spaced-apart parallel relation to one another to form a compact group. Each fuel assembly 12 is secured in its intended location by a lower grid structure 13 and an upper grid structure 14 installed at the time core 11 is assembled.

A baffle plate enclosure 15 laterally surrounds the entire group of fuel assemblies 12, and enclosure 15 is in turn laterally surrounded by a core barrel 16 and is spaced apart therefrom by a series of former plates 17. Core barrel 16 itself is laterally surrounded by a thermal shield 18 and bears at its upper end a locator ring 19 that receives the upper grid structure 14.

For purposes of example, the fuel assemblies 12 are shown as being generally rectangular in transverse crosssection, but it is to be understood that the invention is also applicable to other types of fuel assembly cross-sectional geometries. A typical fuel assembly 12 is made up of a multiplicity of elongated fuel rods 20 that extend longitudinally through a series of egg-crate type spacer grids 21. These grids 21 embrace the fuel rods 20 and, at least within the rod length region covered by each grid 21 constrain the rods 20 against lateral movement relative to one another. The number of rod spacer grids 21 present in a fuel assembly 12 can of course be varied as desired according to the length of the fuel rods and degree of ridgidity desired, but practical support considerations indicate each fuel assembly 12 will have at least three spacer grids 21, one at the mid-point of the assembly 12, and one at each end. The mid-point grids 21 of the assemblies 12 making up the core 11 are positioned in axial alignment so that they lie substantially in a common plane extending transversely through core 11 at right angles to the longitudinal axes of the fuel assemblies 12. The end grids 21 are similarly positioned so as to lie in respectively corresponding common transverse planes.

To permit convenient installation and removal of fuel assemblies 12, the grid structures 13 and 14 are laid out so that there is a certain minimum clearance between adjacent fuel assemblies 12. Thus, at the mid-point or midlength plane of the core 11 there generally exists at the time of installation clearance gaps of different dimensions between the outside edges of the mid-point grids associated with adjacent fuel assemblies 12.

These inter-assembly spaces render the core 11 susceptible to vibration when in operation since the fuel assemblies 12 can be considered as being laterally unsupported over a span approximately equal to their length between grid structures 13 and 14. Fluid passing through core 11 to extract useful heat from the fuel assemblies 12 can excite them into various different modes of lateral vibration. The impact resulting from such dynamically induced vibration, or from externally applied forces such as earthquake shocks can damage the fuel rods 20 and fuel elements and even create a radiation hazard.

The invention proposes to solve these vibration and impact problems by reducing the effective free span of the fuel assemblies 12 and by mechanically limiting the available amplitude for lateral movement among fuel assemblies 12. For such purposes, there are provided a plurality of actuators 22 arranged in a pattern surrounding the group of fuel assemblies 12.

Figure 4:
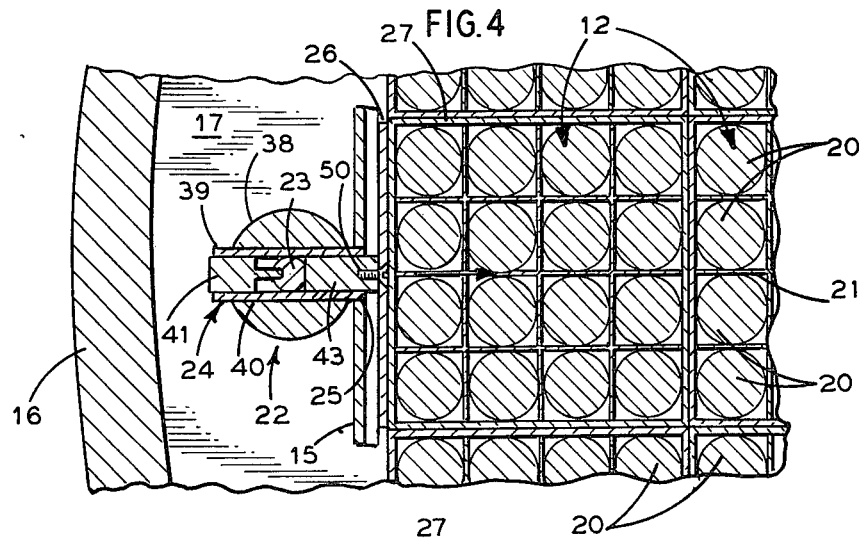
FIG. 4 is a transverse cross-sectional view of the core structure portion illustrated in FIG. 3 as taken along line 4—4 therein.
Figure 3:
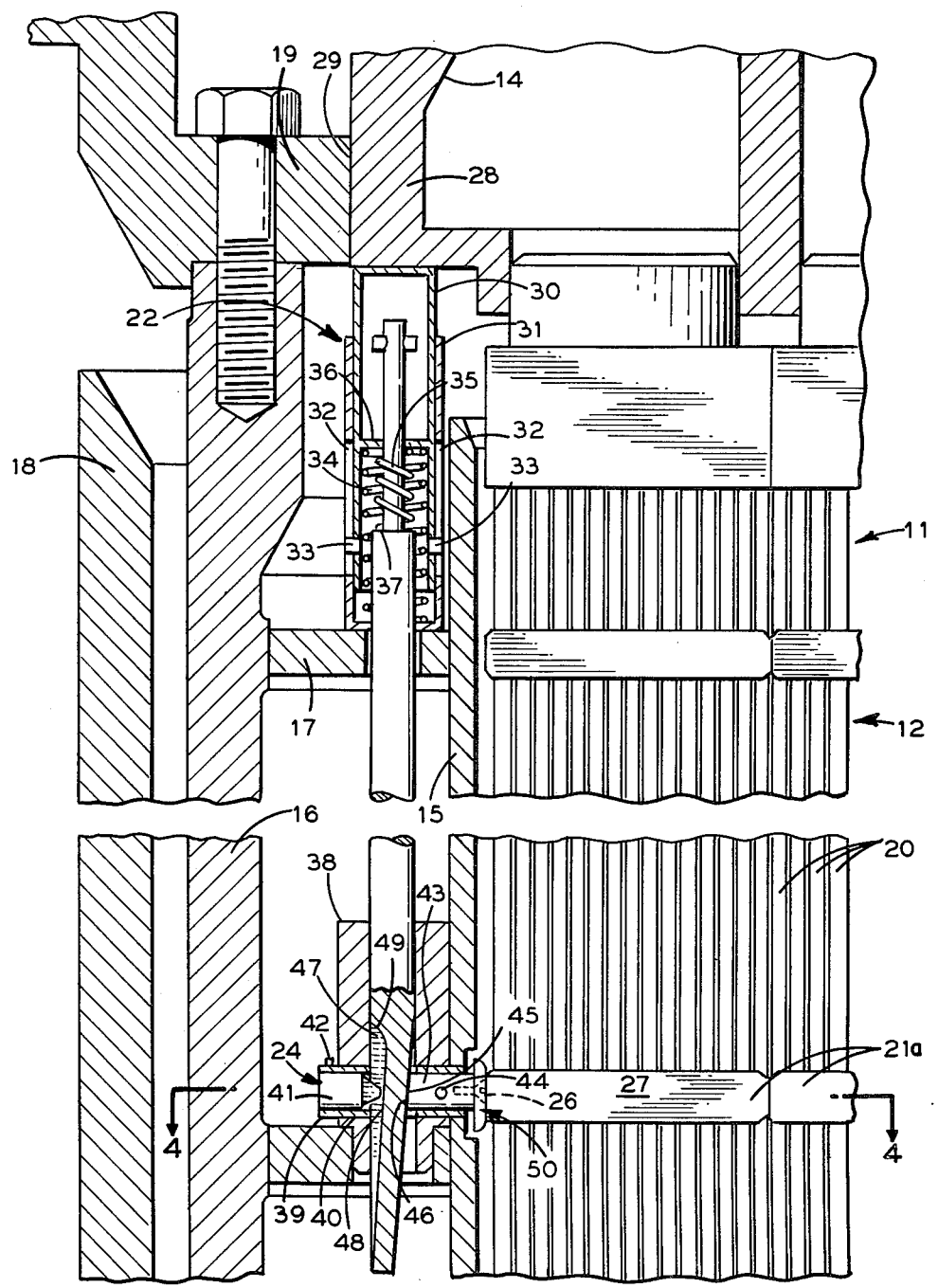
FIG. 3 is an enlarged sectional view of a portion of the core structure in FIG. 1 showing in greater detail a typical actuator used in the core stabilizing arrangement of the invention.

As seen from FIGS. 3 and 4, a typical actuator 22 has a cam rod 23 which is axially moveable in a direction parallel to the longitudinal axes of the fuel assemblies 12, and a follower plunger 24 that is engaged by the cam rod 23 and moved axially thereby in a direction perpendicular to the fuel assemblies 12 axes. This plane of motion produced is that of the mid-point grids 21.

Plunger 24 extends through an aperture 25 provided in baffle plate enclosure 15 and on the inside of plate enclosure 15 there is affixed to the end of plunger 24 a platen 26. Platen 26 is disposed for bearing contact with the outside band portion 27 of the mid-point grid 21 of an associated fuel assembly 12 of that group of fuel assemblies which together form the periphery of the active core 11.

In the particular embodiment shown, it can be noted from FIG. 2 that the composite of fuel assemblies 12 are arranged to fit within a cylindrical core barrel 16 with those fuel assemblies 12 on the periphery each having at least one side of band 27 engaged between platen 26 of an actuator 22. Certain peripheral fuel assemblies 12, i.e. those forming the corners, or steps in the periphery have a second side of band 27 also engaged by a platen 26 of another actuator 22 that presses in a direction perpendicular to that of the first-mentioned actuator 22.

All the actuators 22 are operated concurrently by an input force directed substantially parallel to the longitudinal axes of fuel assemblies 12, thereby exerting upon the peripheral fuel assemblies 12 forces vectorially indicated by arrows in FIG. 2, the compressive forces tending to reduce the clearances within the fuel assembly composite at the mid-point grids 21.

While there are undoubted many other schemes by which concurrent operation of all actuators 22 can be effected, the invention particularly provides actuators 22 that are so constructed and arranged as to operate concurrently in response to forces derived by emplacement of the upper grid structure 14 into the locator ring 19. As can be better seen in FIG. 3, the upper grid structure 14 has a rim 28 that is slidably received by a matching surface 29 of ring 19, and when installed in its normal working position seats upon and is to some degree supported on the upper end of the spring loaded cylinder 30 which is associated with a typical actuator 22.

Cylinder 30 is slidably received within a housing sleeve 31 which is supported by a suitably disposed former plate 17. The sleeve 31 has a pair of opposing longitudinal slots 32 to accomodate a pair of pins 33 affixed to cylinder 30 and extending into respective associated slots 32 to limit the travel of cylinder 30 relative to sleeve 31.

Inside cylinder 30 are two springs 34 and 35. Spring 34 biases cylinder 30 toward an outwardly retracted position relative to sleeve 31. Spring 35 is retained between an internal flange 36 within cylinder 30 and a shoulder 37 on cam rod 23.

From the bottom of sleeve 31, cam rod 23 extends through one or more former plates 17 and the lower end of cam rod 23 is slidably received in a guide sleeve 38 expediently supported by another former plate 17, which guide sleeve 38 also slidably supports the plunger 24 already referred to.

The plunger 24 is of multipart construction and has a cylindrical sleeve 39 axially slidable in a matching bore 40 of guide sleeve 38, a key piece 41 secured within sleeve 39 by a set screw 42, and a wedge piece 43 secured inside sleeve 39 by a pin 44. Platen 26 is affixed to the end of wedge piece 43 by any suitable conventional fastening means, such as a screw 50. Wedge piece 43 has an inclined surface 45 positioned for engagement with a mating inclined surface 46 on cam rod 23. Key piece 41 extends into a longitudinal tapered keyway 47 in cam rod 23 to prevent it from rotating, while allowing it to move axially. Keyway 47 has a depth contour defined by a bottom surface portion 48 running lengthwise approximately parallel to the tapered surfaces 45 and 46 and then terminating in a curved, blind end portion 49.

When cam rod 23 moves downward in guide sleeve 38, surface 46 bears against surface 45 thereby advancing plunger 24 and its platen 26 toward the associated peripheral fuel assembly 12 to exert a compressive force on core 11 in the plane of the mid-point grids 21. The downward movement of cam rod 23, and hence the advancement of plunger 24 and the degree of core 11 compaction effected thereby is limited by the combined stop action of key piece 41 wedge piece 43, and keyway end portion 49. As end portion 49 and adjoining surface 48 within keyway 47 becomes engaged in the limiting space between key piece 41 and wedge piece 43, the resulting restraint prevents further downward movement of cam rod 23.

When cam rod 23 moves upward, as for example when grid structure 14 is removed from ring 19 and springs 34 and 35 are allowed to expand, the keyway surface 48 bears against key piece 41 thereby permitting plunger 24 and platen 26 to move away from the associated fuel assembly 12.

From the foregoing, it will be appreciated by the artisan that the movement of plunger 24 will be actuated by the action of cam rod 23, and that the force exerted by platen 26 upon the fuel assembly 12 will be in proportion to the axial force exerted upon cam rod 23 by compression of spring 35.

One of the distinctive features of the actuators 22 here disclosed is that they are concurrently and automatically placed in operation to stabilize the core 11 fuel assembly 12 components against vibration and lateral displacement upon placement of grid structure 14 into ring 19, all without the need for any externally power forces applying sources.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention

What is claimed is:

1. In a nuclear reactor having a core provided with a baffle plate enclosure, said core consisting of elongated fuel assemblies positioned in adjacent, parallel, laterally spaced apart relation to one another, said fuel assemblies each provided with a mid-point spacer grid having an outside band portion, the improvement of a device for use in stabilizing said core comprising:

former plate means mounted on the exterior of said enclosure, a guide sleeve supported by said plate means, said guide sleeve having a longitudinal passageway of open-end construction, a cylindrical sleeve passing through said guide sleeve transverse the axis of said passageway, a cam rod having two end portions, one of said ends of said cam rod having two surfaces, one an inclined surface and also a keyed surface both of which are provided in opposite directions on the end portion of said cam rod which passes longitudinally through said passageway of said guide sleeve and transversely through said cylindrical sleeve, a key piece passing through said cylindrical sleeve and adapted to follow said keyway of said cam rod, a wedge piece passing through said cylindrical sleeve and having an end adapted to follow said inclined surface of said cam rod, said wedge piece having a second end passing through said enclosure and being provided with a platen for separable engagement to said outer band portion of said grid, spring actuating means provided on the free end of said cam rod whereby downward pressure on said actuating means induces longitudinal movement of said cam rod which is translated into transverse movement of said wedge piece and pressure against said outer band surface of said grid.

2. In a nuclear reactor having a core consisting of elongated fuel assemblies positioned in adjacent, parallel, laterally spaced apart relation to one another, a device for use in stabilizing said core comprising, former plate means mounted on the exterior of the core, a guide sleeve supported by said plate means, said guide sleeve having a longitudinal passageway of open-end construction, another sleeve passing through said guide sleeve transverse to said passageway, a cam rod having two end portions, said cam rod having an inclined surface and a keyed surface formed on the end portion of said cam rod which passes longtiduinally through said passageway of said guide sleeve and transversely through said transverse sleeve, a key piece passing through said transverse sleeve and adapted to said cam rod keyed surface, a wedge piece also passing through said transverse sleeve and having an end adapted to follow said inclined cam rod surface, said wedge piece having a second end provided with a platen for separable engagement with at least one said fuel assemblies, and spring actuating means provided on the other end of said cam rod, whereby force applied to said cam rod in the direction of said keyed surface induces a longitudinal movement of said cam rod which is translated into transverse movement of said wedge piece and pressure against said fuel assembly.

3. The nuclear reactor of claim 1 wherein a plurality of said devices are operatively positioned in spaced relation around the periphery of said baffle plate for engagement with a plurality of said grids, by said platen of each of said individual devices.

4. The nuclear reactor of claim 3 wherein each of said platens of said devices separably engage a grid of said assemblies in a common plane that is tranverse to the longitudinal axis of said assemblies.

5. The nuclear reactor of claim 1 wherein said assemblies are positioned in a more compact group by engagement of said platens with said grid.

6. The nuclear reactor of claim 1 wherein said cam rod keyed surface is provided with mechanical stop means in the form of a curved blind end portion which limits the travel of said key piece thereby limiting the compaction of said plurality of assemblies.

7. In a nuclear reactor having a core consisting of elongated fuel assemblies positioned in adjacent, parallel, laterally spaced apart relation to one another, a device for use in stabilizing the core comprising a cam rod spaced from the reactor core and generally coextensive with at least a portion of and parallel to the elongated fuel assemblies for lengthwise rod movement and transmitting force therealong, said cam rod having a cam surface and a keyed surface formed thereon adjacent to at least one of the fuel assemblies, a plunger having a key adapted to said cam rod keyed surface, and a wedge with an end adapted to follow said cam surface and limit said lengthwise cam rod movement, said wedge having an end provided with a platen for engagment with at least one of the fuel assemblies to apply said transmitted cam rod force inwardly toward the core and against at least one of the fuel assemblies.

* * * * *